United States Patent
Minot et al.

[11] Patent Number: 5,946,438
[45] Date of Patent: Aug. 31, 1999

[54] DEVICE FOR BOTH-WAY TRANSPOSITION BETWEEN OPTICAL SIGNALS AND ELECTRICAL SIGNALS, FOR A COMMUNICATIONS SYSTEM

[75] Inventors: Christophe Minot, Paris; Jean-François Palmier, Fontenay-Aux-Roses; Marcel Bensoussan, Boulogne, all of France

[73] Assignee: France Telecom, France

[21] Appl. No.: 08/978,785

[22] Filed: Nov. 26, 1997

[30] Foreign Application Priority Data

Nov. 28, 1996 [FR] France .................................. 96 14583

[51] Int. Cl.⁶ .............................. G02B 6/24; G02B 6/12; H01L 31/14
[52] U.S. Cl. .................................. 385/88; 257/80; 257/81
[58] Field of Search .............................. 385/88; 257/80, 257/81; 372/26, 33

[56] References Cited

U.S. PATENT DOCUMENTS

| | | | |
|---|---|---|---|
| 4,281,253 | 7/1981 | Culver | 250/551 |
| 4,490,606 | 12/1984 | Lockett et al. | 250/227 |
| 4,749,850 | 6/1988 | Chemla et al. | 250/211 J |
| 5,414,726 | 5/1995 | Raj et al. | 372/26 |
| 5,573,975 | 11/1996 | Cunningham et al. | 437/129 |

FOREIGN PATENT DOCUMENTS

| | | | |
|---|---|---|---|
| 0391597 | 10/1990 | European Pat. Off. | 385/88 |
| 0732782 | 9/1996 | European Pat. Off. | 385/2 |
| WO 9533317 | 12/1995 | WIPO | 385/2 |

*Primary Examiner*—John D. Lee
*Assistant Examiner*—Victoria D. Hao
*Attorney, Agent, or Firm*—Blakely Sokoloff Taylor & Zafman

[57] ABSTRACT

The present invention relates to a device for both-way transposition between optical signals and electrical signals, for a communications system, said device comprising a vertically integrated component comprising an optically driven oscillator based on a negative differential conductance mechanism, for performing optical-to-millimetric conversion on the down path, and an asymmetric Fabry-Perot cavity modulator for performing the electrical-to-optical conversion function on the up path.

38 Claims, 7 Drawing Sheets

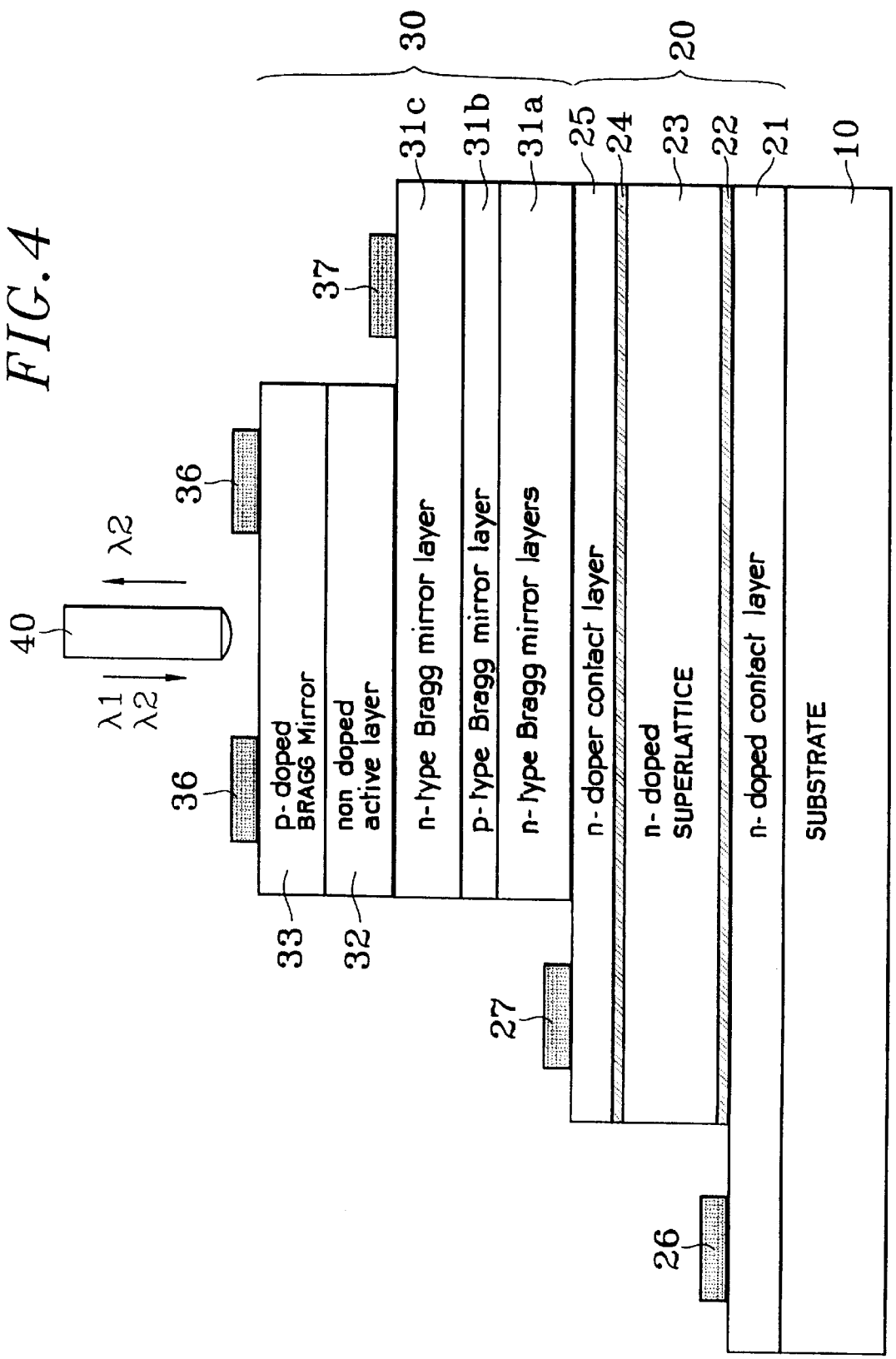

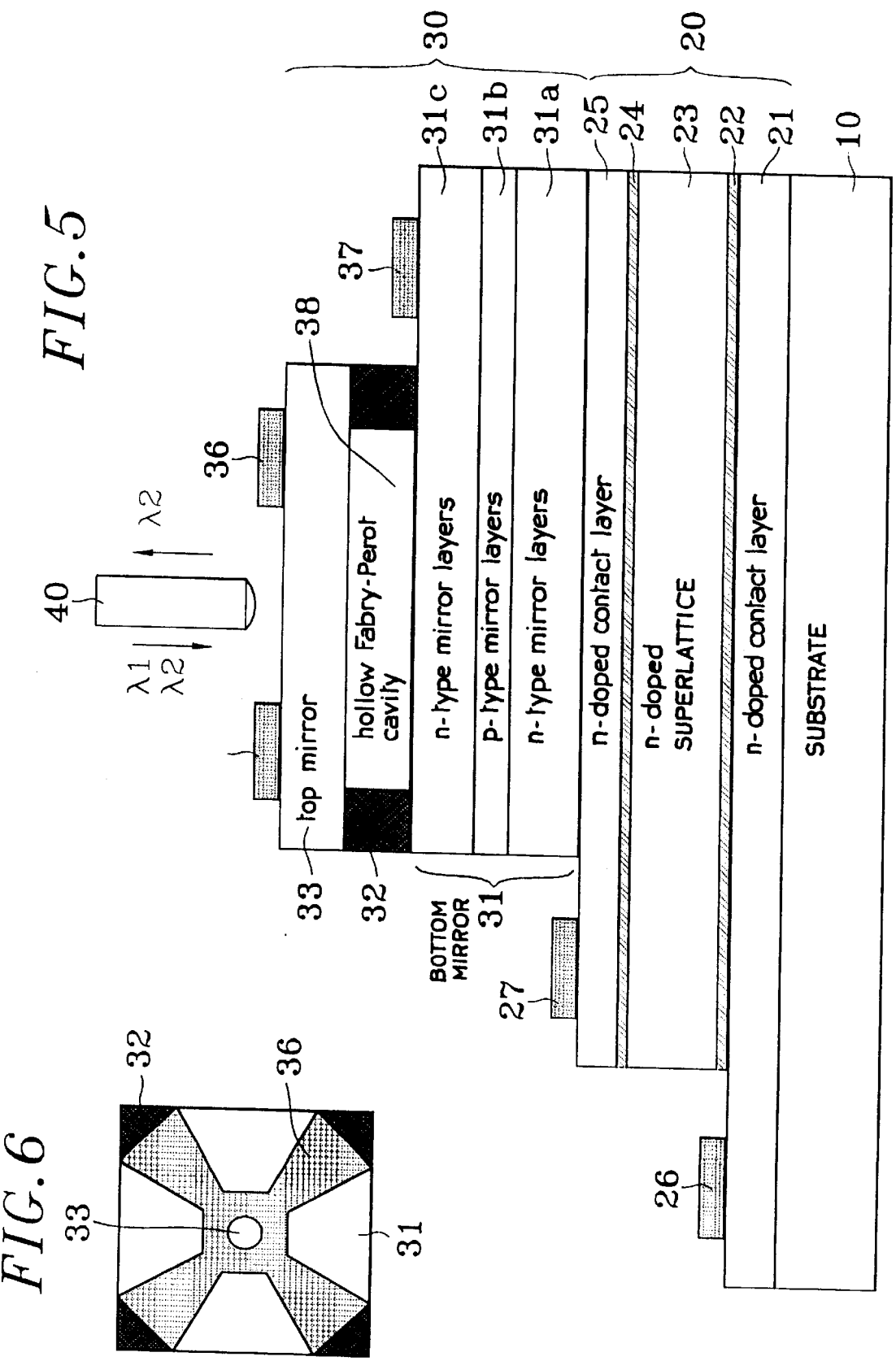

DEVICE FOR BOTH-WAY TRANSPOSITION BETWEEN OPTICAL SIGNALS AND ELECTRICAL SIGNALS, FOR A COMMUNICATIONS SYSTEM

The present invention relates to communications systems using optical signals and electrical signals.

More precisely, the present invention relates to a device for both-way transposition between optical signals and electrical signals.

BACKGROUND OF THE INVENTION

Various fields of application require components making it possible to convert optical signals (in general conveyed by optical fibers) into electromagnetic waves that can propagate through empty space. This applies particularly to the field of telecommunications, in which, to connect subscribers to specific services, it is preferable, for reasons related to the system or to the service to be provided, to use radio waves for the last leg from a terminal connected to the optical fiber distribution network. Such a technique will be beneficial for generalizing portable subscriber terminals by fitting flexibly and cheaply into existing radiocommunications infrastructures.

In the field of telecommunications, demand is becoming increasingly high-data rate oriented, whether it be for optical fiber distribution networks or for radio networks for mobile terminals. Essentially for technical reasons to do with passband, it would seem appropriate for those two types of network to converge, with an optical fiber high data-rate fixed network being extended through empty space by a radio broadband access network operating at a very high frequency, i.e. typically a few tens of GHz (e.g. see references [1, 2, 3, 4, 5, 6, 7]).

In such a radio broadband access network at the ends of optical fibers, the radio coverage is provided by base stations distributed outside or inside buildings. Each of the base stations is connected via optical fibers to an exchange. In particular, it has been demonstrated that, for the purposes of serving buildings, such architectures are much more advantageous than networks having combined fiber-and-coaxial cable links or even fiber links to the subscriber [Ref. 6, 7]. Such high data-rate radio links grafted onto an optical fiber distribution network not only offer all of the advantages that are related to mobility, but also enable major savings to be made on terminal wiring.

In architectures currently being researched [Ref. 3, 4, 5], the radio signal, generated in an exchange, is conveyed in optical form by the optical fiber distribution network towards the stations of the access network, in which stations optical-to-radio conversion is performed to provide the link to the subscribers. Such an exchange-to-subscriber path is generally termed the "down" path.

The design of the opposite, subscriber-to-exchange, or "up" path is more complex. The information arriving at each station of the access network must be converted into optical form. This is the same function as is performed on the down path, where it is centralized for reasons of economy, but in general up-path conversion takes place at data rates that are lower.

A difficulty encountered by attempts to develop such future networks is the problem of providing reliable and cheap active components for radio terminals.

A certain number of components have already been developed, making it possible to perform the optical wave-to-millimetric wave conversion function separately for the down path from the exchange and for the up path returning from the station. Such a component is constituted by a hybrid optical-millimetric duplexer transposer incorporating unit components of the following types in the same module: detector, oscillator, coupler, light source, and modulator. Assembling such a complex set of components has a considerable impact on the overall cost of the terminal.

In a radio-over-fiber link of the type described in the above-mentioned documents, the exchange is connected by optical fiber to a certain number of stations each of which is equipped with an antenna.

For the down path, the radio signal is applied to the optical carrier at the exchange.

Two approaches are under consideration, depending on whether or not the signal includes the radio carrier. At the station, the radio signal extracted from the optical carrier feeds the antenna which communicates by radio through empty space with the mobile terminals. If it exists on the optical carrier, the radio carrier comes directly from optical-to-radio conversion. Otherwise, it is generated by a local oscillator.

For the up path, the radio signals picked up by the antenna of the station modulate an optical carrier generated by a light source. The resulting optical wave is then taken to the exchange over a fiber that is different from the fiber used for the down path, or possibly even over the same fiber.

At the receiver end of the down path, at the station at the end of the optical fiber, the function to be performed is optical-to-millimetric conversion.

It can be performed merely by photodetecting the optical signal coming from the optical fiber, either in an ultra-fast photodiode followed by transistor amplification [8] or directly in a phototransistor, which makes it possible in addition to provide gain in a more integrated manner [9]. Implementing that solution has shown that the radio signal power extracted from the optical carrier remains rather low in spite of the phototransistor. To provide a power level that is high enough for application to the antenna, a microwave amplifier must be added which is complex and costly, especially at high frequencies, such as those planned in such systems.

To mitigate that limitation, consideration is currently being given to an alternative approach that is more advantageous as regards power. It consists in using an optically controlled millimetric oscillator. It would appear to be cheaper provided that sufficiently powerful oscillators can be implemented cheaply, e.g. with unitary components using technology that is much easier than transistors for millimetric amplifiers. Several works have been published on millimetric sources controlled by optical signals [10, 11, 12, 13]. More particularly, the principle of using the high current gain of a 1.3 -$\mu$m light-sensitive phototransistor by integrating it in an oscillator circuit having high output power and possessing a wide locking range at low incident optical power has been demonstrated [14]. Unfortunately, the frequencies obtained in that way remain rather low for the moment.

The above-described approaches handle optical functions separately from electrical functions. An original solution associating both types of function in a common component has been proposed and recently tested successfully in a system experiment [16]. It consists in using a superlattice millimetric diode having negative differential conductance [15, 16].

At the transmitter for the up path, in the end station at the end of the optical fiber, the function to be performed is an electrical-to-optical conversion. On that path, the electrical signal is assumed to result from demodulation, and it is therefore in base band. That solution, currently being experimented at system level, uses a semiconductor laser [16]. The laser is modulated directly by the electrical signal coming from the antenna, and it returns the information to the exchange at a wavelength identical to or different from that of the down path, depending on the chosen coding. The structures are nevertheless quite complex and are implemented using light-guide technology which poses assembly and cost problems.

The major drawback of the above-mentioned state-of-the-art system is its complexity related to the number of sophisticated components it requires, with obvious consequences on its overall cost. A point to be emphasized more particularly is that the functions are totally separated on the two paths: each function is performed by a component which must be both electrically and optically inserted in the flow of information. The costs of assembly and interconnection (in particular for optical technology) form a large portion of the overall cost of the system, especially since the components usually implemented (lasers of modulators) operate under guided propagation conditions.

OBJECTS AND SUMMARY OF THE INVENTION

An object of the invention is to simplify a both-way optical-millimetric link so as to reduce its cost. To achieve this object, it is necessary to reduce the number of sophisticated components used, thereby reducing the number of interconnections (in particular optical interconnections). Such interconnections must also be facilitated by means of a fiber-drawing technique that does not require very high precision. Similarly, the invention aims to choose appropriate technologies to limit the precision constraints that are often imposed when manufacturing high-speed components.

In some ways, these concerns tie in with those that are guiding research into components for optical terminals in the context of bringing the fiber to the home (FTTH). Such research has already led to a certain number of implementations that can, in principle, be adapted by a person skilled in the art to suit the optical-radio field. Examining them shows that, even if such adaptation is successful, a certain number of drawbacks will be encountered, to which the invention proposes to provide solutions.

A first line of research currently being followed actively for the optical access network consists in omitting the light source at the subscriber end. In which case, the terminal is constituted by an opto-electronic modulator operating as a mirror [17, 18]. The mirror receives a light wave emitted from the exchange at a wavelength identical to or different from that of the down path, and returns it to the exchange after applying to it the electrical signal delivered by the subscriber. That solution may be termed "passive". Three types of component have been developed to perform that function. Firstly, in-waveguide Mach-Zehnder type interferometers have been made of lithium niobate and tested experimentally in various system configurations [19]. Secondly, in recent years, electro-absorbant modulators have been developed that have vertical structures and that can be subjected to fiber-drawing more easily than previous modulators [20, 21, 22]. Those components are III–V semiconductor structures of the surface-access asymmetric Fabry-Perot cavity type formed by epitaxy on GaAs or InP substrates. Thirdly, structures of the hollow Fabry-Perot cavity type with an air gap between the two mirrors have been tested experimentally in system configurations in which the data-rate for the up path is quite low [23, 24].

Using such components for radio-optical transposition would offer alternative solutions for the up path but it does not deal with the major concern of the cost of physically uniting the two paths by implementing a single component.

A second approach, also actively under investigation for optical distribution purposes, uses two duplexers capable of performing all-optical transmission functions and reception functions simultaneously.

In that approach, there are two classes of component.

The first class associates a photodetector and a filter isolating the input from the output in a common module in hybrid manner, by implementing a light-guide structure on a common substrate [25]. A device that is more integrated and that offers the above possibility has recently been developed [26]. That device, which is cheaper than the preceding device, integrates a laser and a photodetector that are fully decoupled on a common substrate and in a common waveguide connected to a single fiber. It uses multi-segment DFB laser type structures whose technologies are now well developed.

The other class of device, which is more advantageous as regards fiber-drawing, associates a photodiode and a Fabry-Perot mirror of the same type as described above in a common vertical structure obtained in a single epitaxial growth step [27]. That type of component leads to centralized architecture. In spite of that, like the former class of components, the latter class, when extended to the optical-millimetric field, suffers from drawbacks already emphasized. In particular, since they use a photodiode for the photodetection function, they remain very limited as regards the power level of the output microwave.

To mitigate the drawbacks of the devices proposed in the state of the art, the present invention provides a vertically integrated component comprising an optically driven oscillator based on a negative differential conductance mechanism, such as a Gunn diode, an IMPATT diode, or a superlattice diode, for performing optical-to-millimetric conversion on the down path, and an asymmetric Fabry-Perot cavity modulator for performing the electrical-to-optical conversion function on the up path.

The term "optically driven" applies to two situations, namely a "locking" situation and a "mixing" situation, both of which can be envisaged in the context of the present invention, in two distinct system architectures:

either the radio carrier is generated by the oscillator itself, in which case the oscillator acts as a mixer for mixing its characteristic oscillation, imposed by the characteristics of the circuit in which it is inserted, with the data-carrying signal that arrives at it optically;

or else the radio carrier is conveyed by the optical distribution network, and the frequency of the oscillator is servo-controlled and synchronized continuously on the instantaneous value of the millimetric frequency present on the light wave, in which case the oscillator is said to be "optically locked". Such optical locking is direct if the optical signal servo-controls the oscillator itself, and it is indirect if the oscillator is locked by an electrical signal output by the distinct photodetector.

The device of the present invention operates alternately or simultaneously, for the down path, as an optically driven oscillator capable of delivering sufficient microwave power, and, for the up path, as a mirror modulator driven by a radio signal received by an antenna, thereby modulating an optical carrier sent by an exchange. The down path and the up path can be conveyed over two fibers, or, more cheaply, over a common fiber.

The present invention thus makes it possible to reduce the number of components necessary for the both-way opto-radio link function.

Furthermore, the device of the present invention can be easily subjected to fiber-drawing which constitutes a considerable advantage as regards lowering the cost of the end device.

BRIEF DESCRIPTION OF THE DRAWINGS

Other characteristics, objects, and advantages of the present invention appear on reading the following detailed description with reference to the accompanying drawings which are given by way of non-limiting example, and in which:

FIG. 4 is a diagrammatic vertical section view through a variant of an integrated mirror modulator and superlattice oscillator structure having four contacts;

FIG. 5 is a diagrammatic vertical section view through an integrated hollow-cavity Fabry-Perot mirror and superlattice oscillator structure;

FIG. 6 is a plan view of the hollow-cavity Fabry-Perot mirror portion; and

MORE DETAILED DESCRIPTION

Two embodiments of devices of the present invention for both-way transposition between optical signals and electrical signals are described below.

First embodiment

The first embodiment is constituted by an integrated vertical structure comprising a superlattice oscillator 20 and a Fabry-Perot mirror modulator 30.

Figure 1:
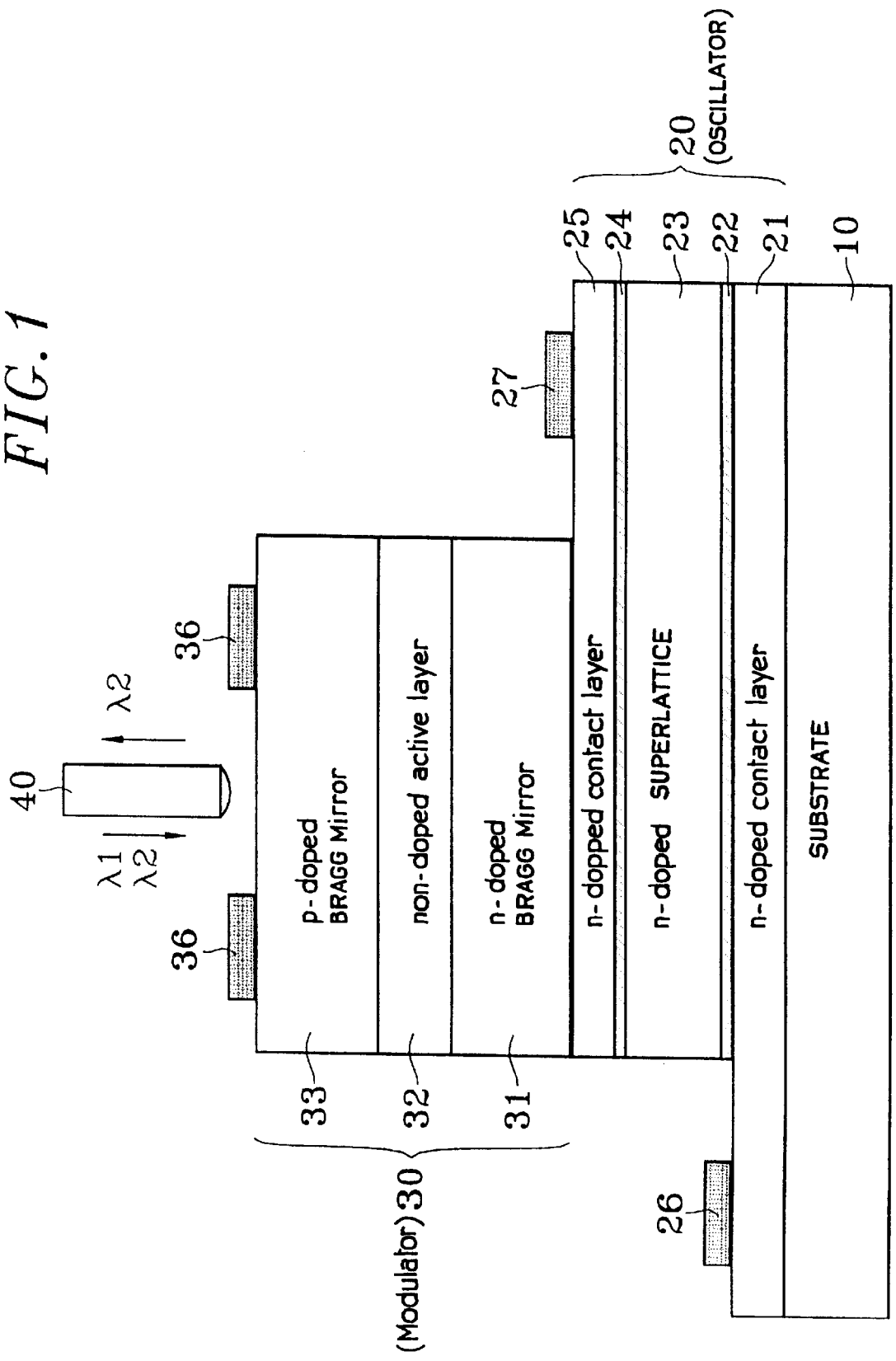
FIG. 1 is a diagrammatic vertical section view through a first embodiment of a component of the invention.

FIG. 1 diagrammatically shows this structure in which an oscillator segment 20 and a modulator mirror segment 30 superposed thereon are integrated vertically by being grown on a common substrate 10.

The component shown in FIG. 1 is provided with three electrodes 26, 27, 36 including an electrode 27 that is common to both of the segments 20 and 30. It is explained below with reference to FIG. 4 that, in a variant, the component may include four electrodes 26, 27, 36, 37, to provide better decoupling between the two segments 20 and 30.

More precisely, the superlattice oscillator 20 comprises the following deposited in succession on the semi-insulating substrate 10;

an n-type contact layer 21;

a graded layer 22;

a superlattice 23;

a graded layer 24; and an n-type contact layer 25.

As shown in FIG. 1, a first metal electrode 26 is deposited on the first contact layer 21 while a second metal electrode 27 is deposited on the second contact layer 25. For this purpose, the first contact layer 21 extends beyond the layers 22 to 25 that are superposed on it so as to have an uncovered surface portion accessible to the electrode 26.

The Fabry-Perot mirror modulator 30 comprises the following deposited in succession on the contact layer 25:

an n-type Bragg mirror 31;

a multiple quantum well layer 32; and a p-type Bragg mirror 33.

The stack of layers 31, 32, 33 is narrower than the contact layer 25 so as to leave uncovered a surface portion thereof accessible to the electrode 27.

An annular metal electrode 36 is deposited on the Bragg mirror 33.

From the optical point of view, the incident light $\lambda 1$, $\lambda 2$ coming from an exchange is injected via an optical fiber 40 into the top surface of the Bragg mirror 33 at the center of the electrode 36, and the light $\lambda 2$ reflected by the modulator 30 is collected in the same fiber 40. The operating wavelengths for which the structure is designed are chosen as a function of the architecture of the system. In a configuration in which the link operates in full-duplex manner, the optical fiber 40 injects at least two wavelengths $\lambda 1$ and $\lambda 2$ into the top surface of the modulator 30. One of the wavelengths, e.g. $\lambda 2$, is allocated to the up path, the other $\lambda 1$ being allocated to the down path. The modulator mirror 30 is active at $\lambda 2$ and transparent at $\lambda 1$, while the oscillator is light-sensitive at $\lambda 1$. To avoid crosstalk between the two segments, it is preferable to have $\lambda 1 > \lambda 2$.

Operation of the modulator mirror 30 is based on the electro-absorbant effect at $\lambda 2$, i.e. the variations in the optical absorption at this wavelength induced by the variations in the voltage applied to this portion of the structure. In the active zone 32, semiconductor materials are used whose optical absorption edge wavelength is in the vicinity of the working wavelength of the modulator. The effect is even more pronounced if quantum wells are used in the active zone.

The modulator 30 thus forms a multiple quantum well asymmetric Fabry-Perot resonator operating in reflection mode. The cavity is designed firstly to have a stop band centered on $\lambda 2$ and a Fabry-Perot peak in the vicinity of $\lambda 2$, and secondly to be transparent to $\lambda 1$.

Since the back mirror 31 must have high reflectivity, it is constituted by a periodically alternating succession of materials of high refractive index and of low refractive index, and of quarter-wave thickness (Bragg mirror).

The front mirror 33 may also be a Bragg mirror of lower reflectivity or merely be constituted by the semiconductor-air interface.

The number of periods of the Bragg mirrors 31 and 33 are set so that the reflectivity is almost zero at $\lambda 2$.

Under the effect of a voltage applied between the two mirrors 31, 33 via the electrodes 26 and 27, the absorption and the refractive index are modified in the cavity. This results in a spectrum shift and a change in the intensity of the Fabry-Perot peak of the cavity and thus of the reflectivity of the structure at the working wavelength ($\lambda 2$). The reflectivity contrast between two bias states depends to a large extent on the quality of the near-extinction that it is possible to obtain in one of the states. These effects are well known, as is the design of the succession of materials required to obtain them.

Depending on the types of material making up the top mirror 33 when it is a Bragg mirror, there are two variants. In one of the structures, the mirror 33 may be made up of insulating dielectrics (e.g. an alternating succession of $SiO_2$ and $TiO_2$) deposited using a conventional method (evaporation, sputtering, etc.). In this case, the deposition for the electrical contact 36 is performed prior to depositing the mirror 33. In the other structure, the mirror 33 is formed of a stack of semiconductor materials with ad-hoc doping.

The oscillator 20 that is light-sensitive at $\lambda 1$ is constituted by a superlattice 23 that is light-absorbant at $\lambda 1$. Operation of it is based on the "negative differential velocity" related to the dynamics of the charge carriers within the miniband resulting from the superlattice effect, and depends on the microwave or millimetric-wave circuit in which it is inserted (in particular on the Q factor of the circuit). By modifying the charge density in the miniband by optical injection, the oscillations are locked effectively, the frequency of the oscillations then being tied to that of the radio subcarrier of the optical carrier. It is also possible to implement local oscillator and mixer type operation when the radio carrier is not applied to the optical carrier. The oscillator then mixes its characteristic frequency with the frequency of the radio signal applied to the optical carrier. With this type of component, good optical-electrical conversion efficiency is obtained leading to comfortably high radio power for applying to the antenna. The frequency of the oscillator 20 is determined on the basis of the parameters of the superlattice 23 and by means of the design of a tuning circuit using well-known engineering rules.

The structure is of the multilayer type. It is essentially constituted by a succession of different III–V alloys.

The entire structure is grown in a single epitaxy step on a semiconductor substrate. The component is then processed by using the usual III–V semiconductor technology methods: lithography, etching, deposition of electrical contacts, etc.

In a non-limiting example, the device of the present invention comprises the following succession of layers grown epitaxially on a matched-lattice InP substrate 10 for operating in the vicinities of the wavelengths 1.55 $\mu$m and 1.3 $\mu$m:

A first set 21–25 of layers forms the oscillator 20 that is light-sensitive in the vicinity of 1.5 $\mu$m:

1) An n-type ($10^{19}$ cm$^{-3}$) GaInAs contact layer 21 having a thickness of about 7,000 Å.

2) A superlattice 23 made of InGaAs/InGaAlAs or some other material that is active in the vicinity of 1.5 $\mu$m, n-type doped at about $2 \times 10^{16}$ cm$^{-3}$. By way of example, the following pair of materials may be chosen: InGaAs/ $(InGaAs)_{0.5}$ $(InAlAs)_{0.5}$, with wells of 60 Å, barriers of 20 Å, and a total thickness of 9,165 Å, for operation in the vicinity of 50 GHz.

3) A contact layer 25 made of GaInAs of the n-type ($10^{19}$ cm$^{-3}$) having a thickness of about 2,000 Å. The exact thicknesses of the layers 21, 23, and 25 may be chosen so that they are m$\lambda$/2 thick (where m is an integer), $\lambda$ being the reference wavelength for the design of the modulator 30. The layer 25 must absorb the residual 1.3 $\mu$m which has not been absorbed or reflected in the modulator 30, so as to isolate the oscillator 20 optically from the modulator 30. Its thickness may be 1,845 Å.

A second set 31–33 of layers forms the 1.3 -$\mu$m modulator 30:

4) A Bragg mirror 31 reflective in a band centered on 1.3 $\mu$m, or even a dual mirror reflective in two bands centered on 1.52 $\mu$m and 1.3 $\mu$m, constituted by an alternating succession of layers that are n-doped at about $10^{18}$ cm$^{-3}$, and that are mostly $\lambda$/4 at $\lambda$=1.414 $\mu$m, e.g. 5 periods of an alternating succession of 10 layers as follows:

1,034 Å of $(InGaAs)_{0.62}$ $(InAlAs)_{0.38}$
1,099 Å of InAlAs
1,034 Å of $(InGaAs)_{0.62}$ $(InAlAs)_{0.38}$
1,099 Å of InAlAs
1,034 Å of $(InGaAs)_{0.62}$ $(InAlAs)_{0.38}$
2,198 Å of InAlAs
1,034 Å of $(InGaAs)_{0.62}$ $(InAlAs)_{0.38}$
1,099 Å of InAlAs
1,034 Å of $(InGaAs)_{0.62}$ $(InAlAs)_{0.38}$
1,099 Å of InAlAs

5) A non-doped active layer 32 absorbant at 1.3 $\mu$m and constituted by 11,014 Å of $(InGaAs)_{0.73}$ $(InAlAs)_{0.27}$. A portion of this layer may be p-doped ($5 \times 10^{18}$ cm$^{-3}$) to reduce the thickness of the non-doped zone.

6) A p-doped Bragg mirror 33 ($5 \times 10^{18}$ cm$^{-3}$) constituted by 2 layers as follows:

1,005 Å of InAlAs
938 Å of $(InGaAs)_{0.62}$ $(InAlAs)_{0.38}$

Over a small portion of its thickness, each of the contact layers 21 and 25 has a gradually changing composition 22, 24 serving to eliminate sudden discontinuities in the conduction band.

In this example, the metal electrode 27 deposited on the layer 25 is common both to the oscillator segment 20 and to the modulator segment 30.

Figure 2:
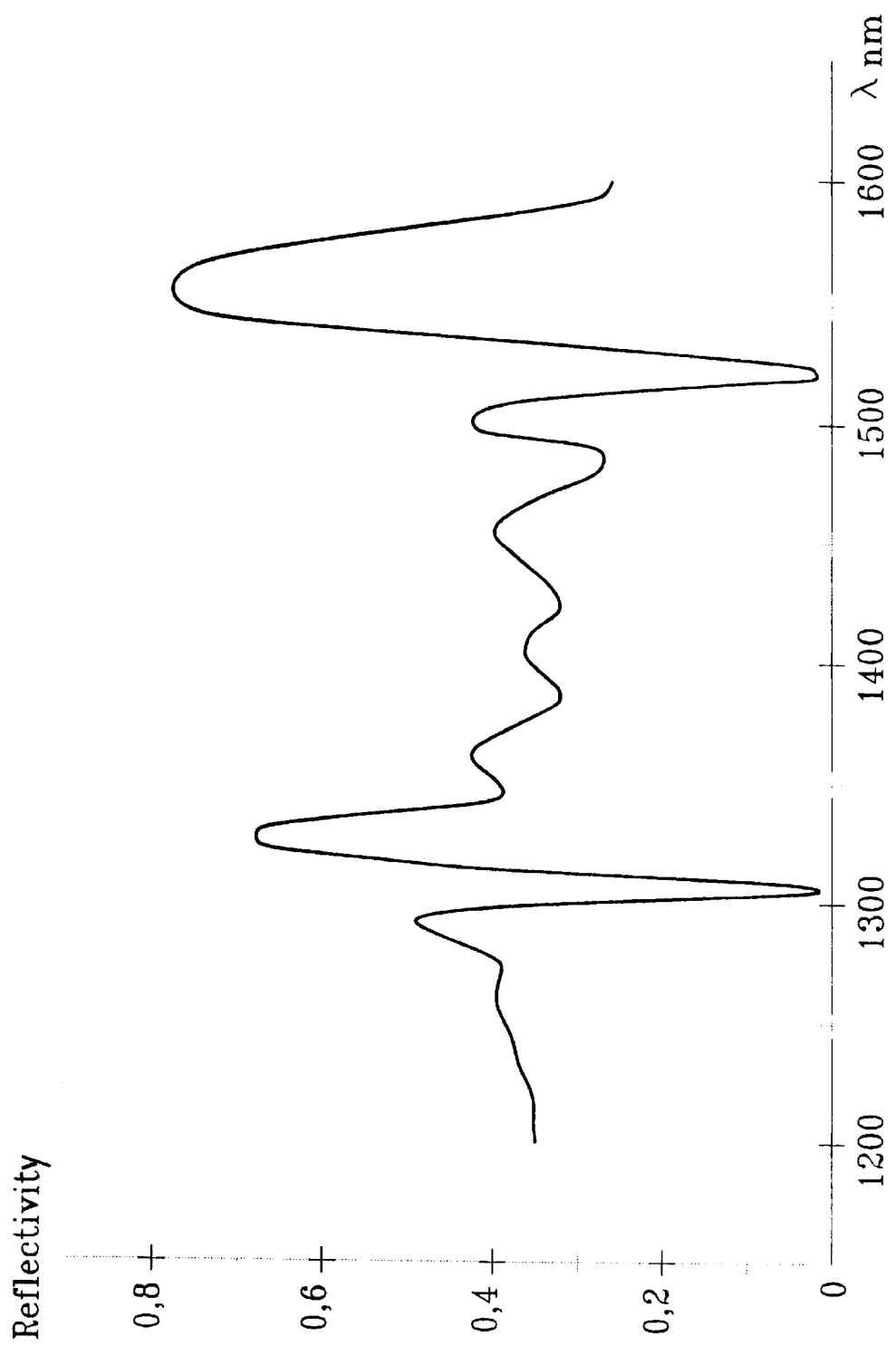
FIG. 2 shows the reflectivity spectrum of the integrated mirror modulator and superlattice oscillator structure of FIG. 1.

A model of the reflectivity of the entire set of layers over the range 1.2 $\mu$m to 1.6 $\mu$m is shown in FIG. 2. This model shows that the reflectivity is almost zero at the wavelengths $\lambda 1$=1.52 $\mu$m and $\lambda 2$=1.3 $\mu$m. The electro-absorbant effect takes place in the vicinity of $\lambda 1$, its influence is small on the Fabry-Perot peak in the vicinity of $\lambda 2$ because this wavelength is distant from the absorbent region and it is subjected only to small variations in index.

Figure 3A:
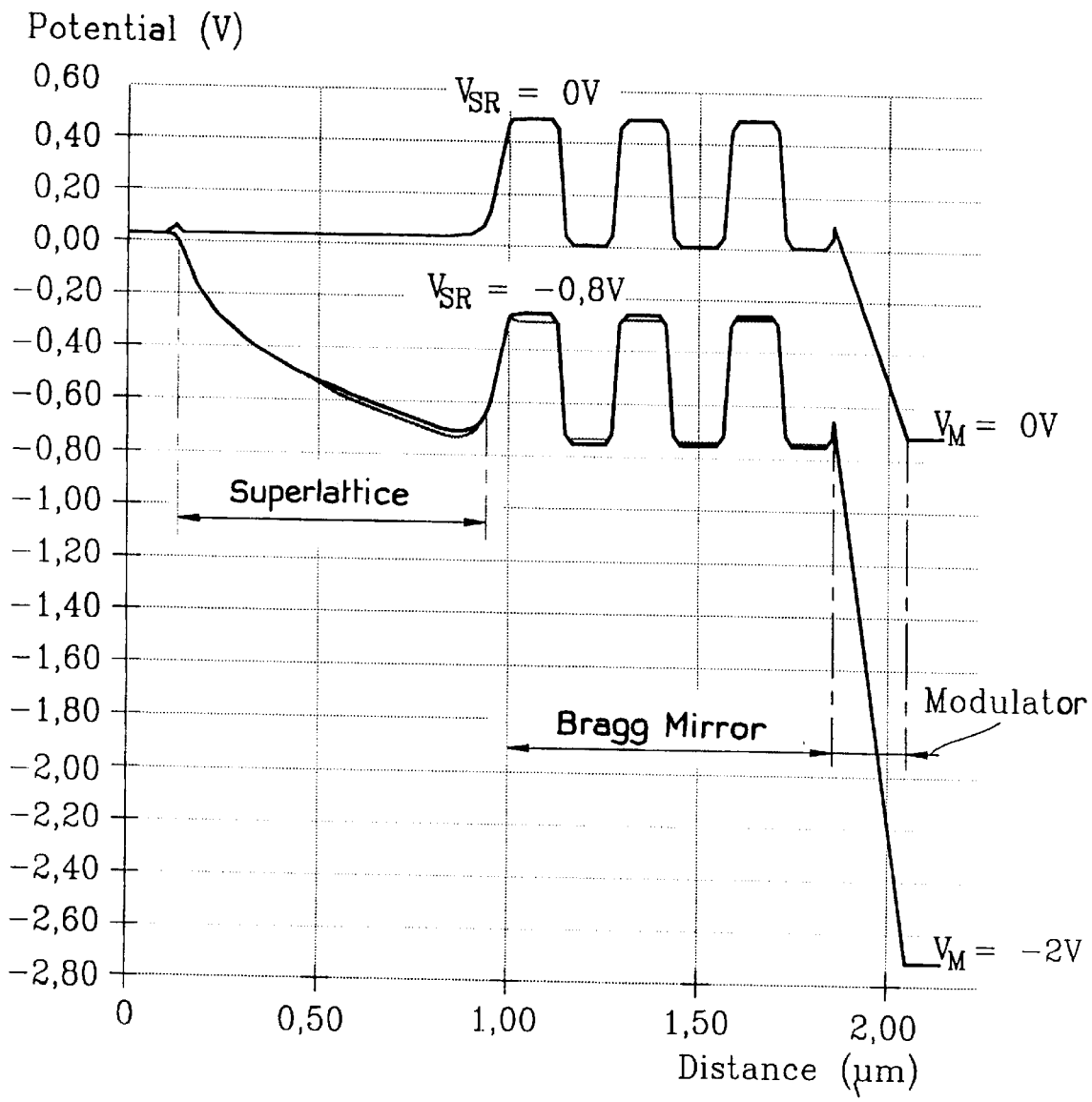
FIG. 3a shows a simulation of the internal potential in an integrated mirror modulator and superlattice structure of FIG. 1.
Figure 3B:
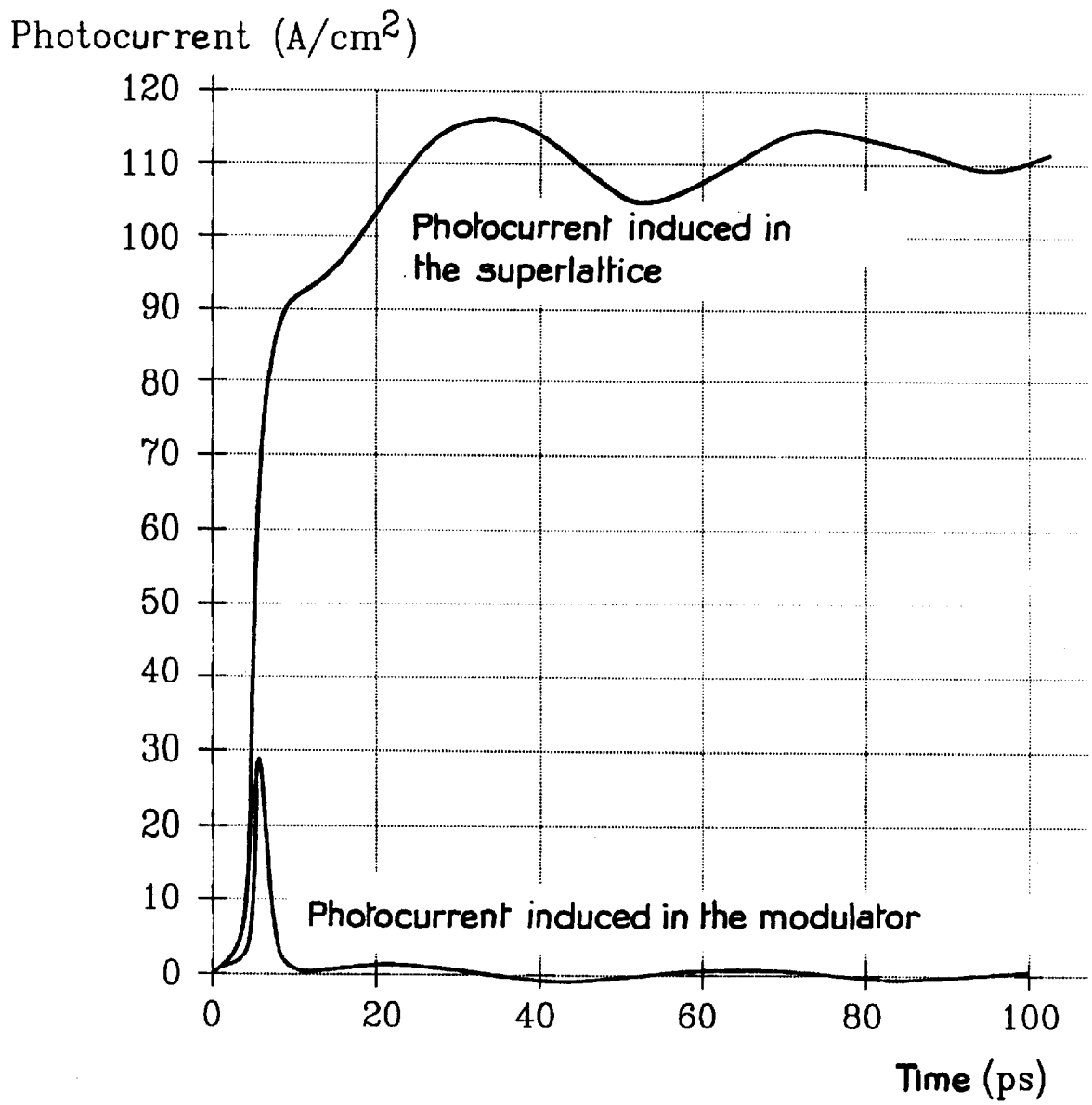
FIG. 3b shows the time response consequent upon exciting the superlattice oscillator only, with a short (1 ps) optical pulse (the density of the light-generated carriers is about $10^{15}$ cm$^{-3}$)

FIG. 3 shows the result of a two-dimensional electrical simulation for a multilayer structure similar to the above-described structure from the electrical point of view, but with a simplified stack of layers for the Bragg mirror 31 (only three periods). FIG. 3$a$ shows the potential in the structure in the direction perpendicular to the layers for various successive sections in the second dimension. In FIG. 3$a$, $V_{SR}$ and $V_M$ are the voltages applied to the superlattice 23 and to the modulator 30. The potential is shown for the equilibrium situation and when the device is biased.

Under these bias conditions, the superlattice oscillator 20 is excited by a short (1 ps) optical pulse at 1.52 $\mu$m. The photocurrent induced is shown in FIG. 3$b$. It shows an oscillation at a frequency in the vicinity of 25 GHz in the superlattice 23. A photocurrent at the same frequency is also induced in the modulator segment 30, which indicates that there is a certain amount of crosstalk between the two paths. This effect is not problematic when the oscillator 20 is locked by the optical signal: in which case the signal on the down path is centered on a high frequency (25 GHz in the example modelled), and it is in base band on the up path, and it is easy to effect filtering between the two paths. The same does not apply when the oscillator operates as a local oscillator and when the two paths are in base band.

A variant shown diagrammatically in FIG. 4 makes it possible to isolate the two segments 20 and 30 electrically. It consists in replacing certain n-type layers of the Bragg mirror 31 with non-doped or p-type layers, e.g. one period (31b) of the five periods being a p-type period flanked by two n-type periods (31a and 31c) on either side. Two separate contacts 27 and 37 are then provided on the layers 25 and 31c, as shown in FIG. 4, where in FIG. 1, there is one common contact. These contacts 27 and 37 are allocated respectively to the superlattice oscillator 20 and to the modulator 30 forming the Fabry-Perot mirror. For this purpose, the layer 31c extends beyond the superposed layers 32, 33 for receiving the contact 37.

Second embodiment

In the second embodiment, the integrated vertical structure comprises a hollow-cavity Fabry-Perot mirror 30 and a superlattice oscillator 20.

FIG. 5 is a diagram showing this structure.

Many of the elements are common to both embodiments.

In particular, FIG. 5 shows a superlattice oscillator 20 comprising the following deposited in succession on a semi-insulating substrate 10:
an n-type contact layer 21;
a graded layer 22;
a superlattice 23;
a graded layer 24; and
an n-type contact layer 25;
as well as two metal contacts 26, 27 deposited respectively on the contact layer 21 and on the contact layer 25, as described above with reference to FIGS. 1 to 4.

Conversely, in the embodiment shown in FIG. 5, the modulator 30 is formed of a hollow Fabry-Perot cavity, i.e. the modulator 30 comprises two mirrors 31 and 33 separated by a layer of air 38.

The top mirror 33 is suspended by a spacer layer 32 above the bottom mirror 31 which overlies the superlattice oscillator 20.

This type of embodiment can be obtained in two technological steps: etching the pattern in the top mirror 33 and chemically etching the layer 32 flanked by being grown between the two mirrors 31 and 33 of the structure 30. This layer 32 is designed to facilitate this treatment.

The top mirror 33 then behaves like a deformable membrane. The thickness of the cavity 38 is variable and can be modulated under the effect of a voltage applied between the membrane 33 and the fixed bottom mirror 31 by means of the electrodes 37, 36 deposited respectively on mirror layer 31c and on mirror layer 33.

The resonance of the cavity 38 is thus modulable, and thus, at a fixed operating wavelength, the reflectivity of the structure follows the same modulation.

In a non-limiting example, the device of the present invention shown in FIG. 5 comprises the following succession of layers grown epitaxially on an InP substrate 10:

A first set 21–25 of layers forms the oscillator 20 that is light-sensitive in the vicinity of 1.5 $\mu$m:

1) An n-type ($10^{19}$ cm$^{-3}$) GaInAs contact layer 21 having a thickness of about 7,000 Å.

2) A superlattice 23 made of InGaAs/InGaAlAs or some other material that is active in the vicinity of 1.5 $\mu$m, n-type doped at about $2\times10^{16}$ cm$^{-3}$. By way of example, the following pair of materials may be chosen: InGaAs/(InGaAs)$_{0.5}$ (InAlAs)$_{0.5}$, with wells of 60 Å, barriers of 20 Å, and a total thickness of 9,165 Å, for operation in the vicinity of 50 GHz.

3) A contact layer 25 made of GaInAs of the n-type ($10^{19}$ cm$^{-3}$) having a thickness of about 2,000 Å. The exact thicknesses of the layers 21, 23, and 25 may be chosen so that they are m$\lambda$/2 thick (where m is an integer), Å being the reference wavelength for the design of the modulator. The layer 25 must absorb the residual 1.3 $\mu$m which has not been absorbed or reflected in the modulator 30, so as to isolate the oscillator 20 optically from the modulator 30. Its thickness may be 1,845 Å.

A second set 31–33 of layers forms the 1.3 -$\mu$m modulator 30:

4) A Bragg mirror 31 reflective in a band centered on 1.3 $\mu$m, e.g. 26 periods of an alternating succession of 2 layers as follows:
938 Å of (InGaAs)$_{0.62}$ (InAlAs)$_{0.38}$
1,005 Å of InAlAs 5) A layer 32 making selective chemical etching possible, e.g. made of InP.

6) A p-doped Bragg mirror 33 ($5\times10^{18}$ cm$^{-3}$) constituted by 2 layers as follows:
1,005 Å of InAlAs
938 Å of (InGaAs)$_{0.62}$ (InAlAs)$_{0.38}$ In this embodiment too, over a small portion of its thickness, each of the contact layers 21 and 25 has a gradually changing composition 22, 24 serving to eliminate sudden discontinuities in the conduction band.

The succession of the layers is the same as in the first embodiment up to layer 25. Layer 31 is a single 1.3 -$\mu$m Bragg mirror. Beyond it, layer 32 must be removed by chemical etching. Its thickness is a multiple of 0.65 $\mu$m. The layers 33 constitute a Bragg mirror.

FIG. 6 is a plan view of the structure of the modulator.

Figure 7:
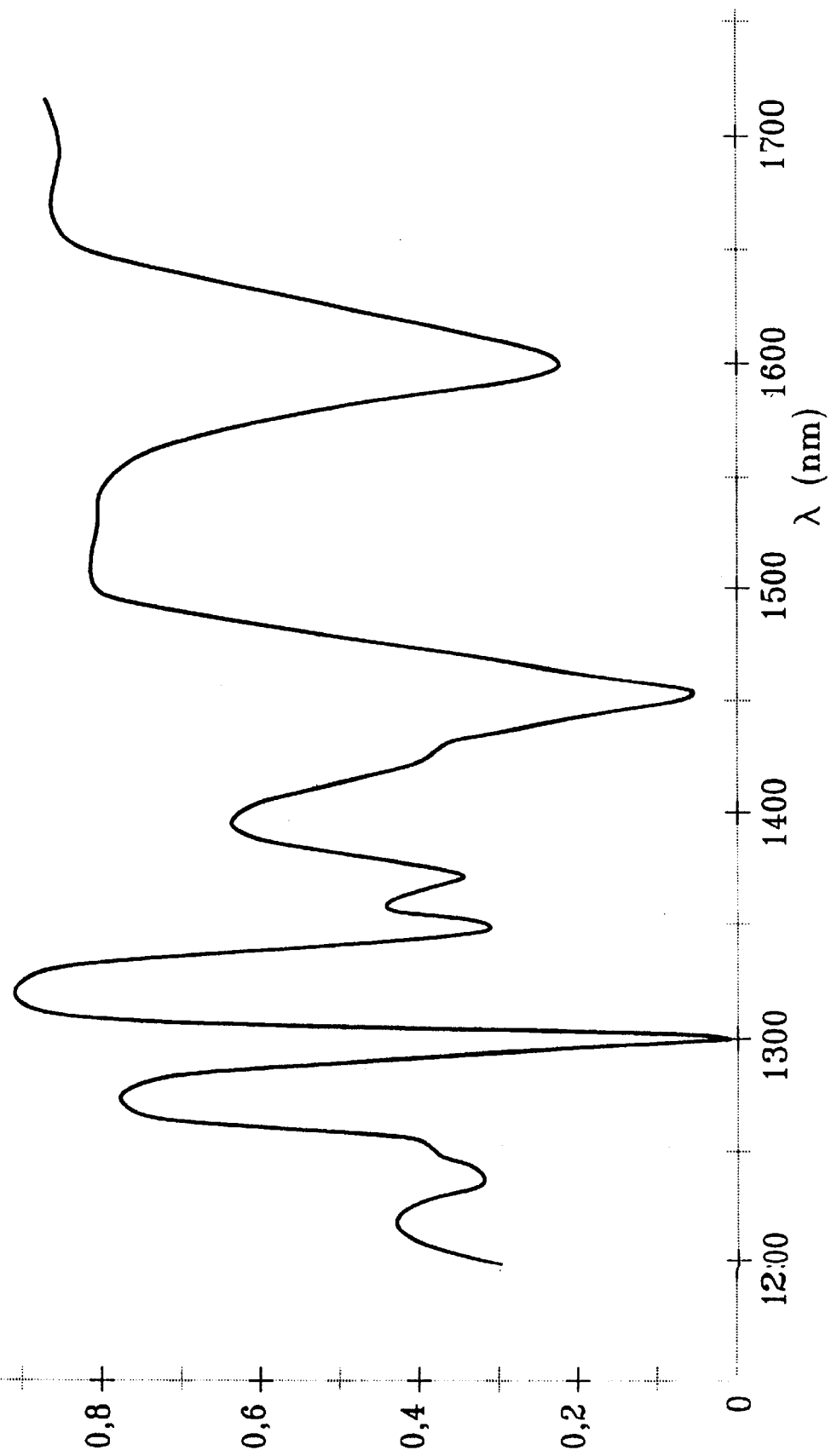
FIG. 7 shows the reflectivity spectrum of the integrated hollow-cavity Fabry-Perot mirror and superlattice oscillator structure of FIG. 5.

FIG. 7 shows a model of the reflectivity of the resulting device. Its transmission is quite low between 1.5 $\mu$m and 1.54 $\mu$m, but varies very little, and therefore does not depend on the voltage applied to the modulator 30.

Naturally, the present invention is not limited to the above-described particular embodiments, but rather it extends to any variant lying with the spirit of the invention.

The fiber 40 may apply the optical signals $\lambda 1$, $\lambda 2$ either via the top of the structure, in which case the oscillator 20 is deposited by epitaxial growth prior to the modulator 30, or via the bottom of the structure, through the substrate 10, in which case the modulator 30 is deposited by epitaxial growth prior to the oscillator 20. The latter configuration makes it possible to reduce the surface area of the oscillator, which may be advantageous to reduce its capacitance and to reach the higher frequencies in the millimetric range.

In a variant, the device of the present invention operates with the oscillator 20 being optically driven indirectly. In this variant, the modulator segment 30 is used alternately as a mirror modulator for the up path and as a photodetector for the down path. An electro-absorbant modulator 30 delivers a photocurrent when it is absorbent. The photodetected signal then serves to drive the oscillator segment 20 electrically.

With an alternating cycle, the duplexer is no longer used as a duplexer. The photosensitivity of the oscillator 20 and the transparency of the modulator 30 are not longer required, and it is not necessary to use two different wavelengths. If, however, two difference wavelengths are used, it is advantageous to choose a wavelength for the photodetection that is slightly shorter than the working wavelength of the modulator 30 (e.g. less than 1.28 $\mu$m for the modulator 30 whose reflectivity is shown in FIG. 2). This variant makes it possible to improve the operating flexibility and possibilities of the component.

The invention is applicable to any communications system architecture using a both-way transposition interface between optical signals and electrical signals, regardless of the approach envisaged depending on whether or not the optical signal includes the radio carrier.

References

[1] Fiber optic millimeter-wave subcarrier-transmission links for personal radio communication systems, H. OGAWA and D. POLIFKO, IEEE MTT-S Digest p. 555 (1992)

[2] The merging of photonic and microwave technologies, D. POLIFKO and H. OGAWA, Microwave Journal p. 75 (March 1992)

[3] RACE R2005: Microwave optical duplex antenna link, J. J. O'RELLY, P. M. LANE, M. H. CAPSTICK, H. M. SALGADO, R. HEIDEMANN, R. HOFSTETTER and H. SCHMUCK, IEEE PROCEEDINGS-J, Vol. 140, No. 6, pp. 385 (December 1993)

[4] Proposal of fiber and radio extension link for future personal communications, S. KOMAKI, K. TUKAMOTO, S. HARA, and N. MORINAGA, Microwave and Optical Technology Letters 1993, Vol. 6, No. 1, pp. 55

[5] Fiber-optic link architecture for microwave subcarrier transmission and reception, G. K. GOPALAKRISHNAN, K. J. WILLIAMS, R. P. MOELLER, W. K. BURNS and R. D. ESMAN, Electron. Lett. 1995, 31, (20), pp. 1764

[6] Millimeter-wave (39 GHz) fibre-wireless transmission of broadband multichannel compressed digital video, J. PARK and K. Y. LAU, Electron. Lett. 1996, 32, (5), pp. 474

[7] Comparison of fibre and coaxial link for access network in microcellular PCS, H. JUNG and O. K. TONGUZ, Electron. Lett. 1996, 32, (5), pp. 425

[8] Zero-bias edge-coupled InGaAs photodiodes in millimetre radio-fibre systems, D. WAKE, N. G. WALKER and I. C. SMITH

[9] Optically-biased, edge-coupled InP/InGaAs heterojunction phototransistors, D. WAKE, D. J. NEWSON, M. J. HARLOW and I. D. HENNING, Electron. Lett. 1993, 29, (25), pp. 2217

[10] Fiber optic methods for injection locked oscillators, S. E. LIPSKY and A. S. DARYOUSH, Microwave Journal p. 80 (January 1992)

[11] 60 GHz sources using optically driven heterojunction bipolar transistors, D. C. SCOTT, D. V. PLANT and H. R. FETTERMAN, Appl. Phys. Lett. 61 (1) pp. I (1992)

[12] Ka-band FM video subcarrier transmission using monolithic integrated HEMT photodetector, H. OGAWA, S. BANBA, H. KAMITSUNA and D. POLIFKO, Fourth Optoelectronics Conference (OEC 92) Technical Digest p. 22 (July 1992)

[13] W-Band optically controlled Gunn subharmonic oscillator, X. W. ZHU, Y. Y. CHEN and S. F. LI, IEEE MTT6S DIGEST pp. 365 (1992)

[14] Optical injection locking of microstrip MESFET oscillator using heterojunction phototransistors, D. SOMMER, N. J. GOMES and D. WAKE, Electron. Lett. 1994, 30, (13), pp. 1097

[15] Direct optical injection locking of 20 GHz superlattice oscillators, J. F. CADIOU, J. GUENA, E. PENARD, P. LEGAUD, C. MINOT, J. F. PALMIER, H. LE PERSON and J. C. HARMAND, Electron. Lett. 1994, 30, (20), pp. 1690

[16] System design for radio over fiber in the millimeter wave range, J. F. CADIOU, E. PENARD, P. LEGAUD, J. GUENA, F. DEVAUX, C. MINOT, J. F. PALMIER, D. MATHOORASING and C. KAZMIERSKI, IEEE MTT-S OPTICAL MICROWAVE INTERACTIONS pp. 185 (1994)

[17] LOCNET: A fiber in the loop system with no light source at the subscriber end, L. ALTWEGG, A. AZIZI, P. VOGEL, Y. WANG and F. WYLER, J. Lightwave Technol. vol. 12 pp. 535, 1994

[18] Simultaneous two-way light intensity modulation optical transmission at the same bit rate without a light source in the subscriber terminal, C. GIBASSER, J. ABIVEN, C. RAMUS, F. HUET and J. SAULNIER, Electron. Lett. 1994, 30, (13), pp. 1162

[19] A 1.3 $\mu$m LiNbO$_3$ reflective modulator, hybridised with a photoreceiver, for bidirectional full-duplex transmission, C. RAMUS, F. HUET, J. SAULNIER, C. GIBASSIER, J. ABIVEN and S. DUREL, ECIO'95: 7th European conference on integrated optics, Delft, NLD (Mar.–Jun. 4, 1995)

[20] Fabry-Perot reflectance modulator for 1.3 $\mu$m from (InAlGa)As materials grown at low temperature, I. J. FRITZ, B. E. HAMMONS, A. J. HOWARD, T. M. BRENNAN and J. A. OLSEN, Appl. Phys. Lett. 62, 919 (1993)

[21] All-optical, high contrast GaInAlAs multiple quantum well asymmetric reflection modulator at 1.3 $\mu$m, M. F. KROL, T. OHTSUKI, G. KHITROVA, R. K. BONCEK, B. P. McGENNIS, H. M. GIBBS and N. PEYGHAMBARIAN, Appl. Phys. Lett. 62, 1550 (1993)

[22] 1.3 $\mu$m electroabsorption reflection modulators on GaAs, S. M. LORD, J. A. TREZA, M. C. LARSON, B. PEZESHKI and J. S. HARRIS, Appl. Phys. Lett. 63, 806 (1993)

[23] Widely and continuously tunable micromachined resonant cavity detector with wavelength tracking, M. S. WU, E. E. VAIL, G. S. LI, W. YUEN and C. J. CHANG-HASNAIN, IEEE Photonics Technol. Lett. 8, 1, 98 (1996)

[24] Continuously tunable micromachined vertical cavity surface emitting laser with 18 nm wavelength range, M. C. LARSON, A. R. MASSENGALE and J. S. HARRIS, Electron. Lett. 1996, 32, (5), pp. 330

[25] Polarization-independent filtering in a grating-assisted horizontal directional coupler, S. FRANCOIS, S. FOUCHET, N. BOUADMA, A. OUGAZZADEN, M. CARRE, G. HERVE GRUYER, M. FILOCHE and A. CARENCO, IEEE Photonics Technol. Lett. 7, 7, 780 (1995)

[26] Full-duplex operation of an in-line transceiver emitting at 1.3 $\mu$m and receiving at 1.5 $\mu$m, N. NAKAJIMA, J. CHARIL, D. ROBEIN, A. GLOUKHIAN, B. PIRRE, J. LANDREAU, S. GROMAIRE and A. LEROY, Electron. Lett. 1996, 32, (5), pp. 473

[27] Simultaneous bidirectional signalling using multiquantum well reflective modulator/detector, C. J. G. KIRKBY, R. M. ASH, A. J. MOSELEY and A. C. CARTER, Electron. Lett. 1996, 27, (25), pp. 2374.

We claim:

1. A device for both-way transposition between optical signals and electrical signals, for a communications system, said device comprising a vertically integrated component comprising an optically driven oscillator based on a negative differential conductance mechanism, for performing optical-to-millimetric conversion on the down path, and an asymmetric Fabry-Perot cavity modulator for performing the electrical-to-optical conversion function on the up path.

2. A device according to claim 1, wherein the optically driven oscillator is chosen from the group comprising: Gunn diodes, IMPATT diodes, and superlattice diodes.

3. A device according to claim 1, wherein the modulator serves as a mirror driven by a radio signal received by an antenna modulating an optical carrier sent by an exchange.

4. A device according to claim 1, wherein the Fabry-Perot cavity modulator includes a plurality of mirrors and at least one of the mirrors of the Fabry-Perot cavity is based on semi-conductor layers.

5. A device according to claim 1, wherein the modulator is transparent to the wavelength at which the oscillator is active.

6. A device according to claim 1, including at least one contact layer between the optically driven oscillator and the Fabry-Perot cavity modulator, which contact layer is transparent to the wavelength to which the oscillator is sensitive, and organized so as not to impart electrical or optical coupling between the oscillator and the modulator.

7. A device according to claim 1, further including a single optical fiber organized to convey to the component two wavelengths: namely a first wavelength to which the modulator is transparent and the oscillator is sensitive, and a second wavelength at which the modulator operates.

8. A device according to claim 7, wherein the optical fiber conveys the optical signal to the top of the device, and the oscillator is deposited by epitaxial growth prior to the modulator.

9. A device according to claim 7, wherein the optical fiber conveys the optical signal to the bottom of the device, through a substrate, and the oscillator is deposited by epitaxial growth after the modulator.

10. A device according to claim 1, wherein the modulator is organized to reflect a wavelength that is shorter than the wavelength to which the oscillator is sensitive.

11. A device according to claim 1, wherein the oscillator comprises two contact layers flanking a superlattice.

12. A device according to claim 11, wherein each of the two contact layers has a gradually changing composition over a portion of its thickness adjacent to the superlattice.

13. A device according to claim 1, wherein the oscillator comprises:
an n-type GaInAs contact layer;
a superlattice; and
an n-type GaInAs contact layer.

14. A device according to claim 13, wherein superlattice includes an the active layer made of InGaAs/InGaAlAs.

15. A device according to claim 13, wherein the superlattice includes an active layer made of InGaAs/(InGaAs)$_{0.5}$ (InAlAs)$_{0.5}$.

16. A device according to claim 1, wherein the modulator is a Fabry-Perot mirror modulator which comprises a back first mirror, an active layer, and a front second mirror.

17. A device according to claim 16, wherein the active layer is a multiple quantum well layer.

18. A device according to claim 16, wherein the back mirror of the modulator is a Bragg mirror.

19. A device according to claim 16, wherein the back mirror of the modulator is constituted by a periodically alternating succession of materials of high refractive index and of low refractive index, and of quarter-wave thickness.

20. A device according to claim 16, wherein back mirror of the modulator is constituted by a stack of semi-conductor materials.

21. A device according to claim 16, wherein the first mirror of the modulator is formed of an alternating succession of layers made of (InGaAs)$_{0.62}$ (InAlAs)$_{0.38}$ and of InAlAs.

22. A device according to claim 16, wherein front mirror of the modulator is a Bragg mirror.

23. A device according to claim 16, wherein the front mirror of the modulator is constituted by the interface between air and a layer of semiconductor material.

24. A device according to claim 16, wherein the front mirror of the modulator is constituted by a stack of insulating dielectrics.

25. A device according to claim 16, wherein the active layer of the modulator is formed of (InGaAs)$_{0.73}$ (InAlAs)$_{0.27}$.

26. A device according to claim 25, wherein a portion of the active layer is p-doped.

27. A device according to claim 16, wherein the second mirror is constituted by an alternating succession of layers of InAlAs and of (InGaAs)$_{0.62}$ (InAlAs)$_{0.38}$.

28. A device according to claim 1, wherein the modulator is a hollow-cavity Fabry-Perot mirror.

29. A device according to claim 28, wherein the modulator comprises a back first mirror, a layer of air and a front second mirror.

30. A device according to claim 28, wherein the etched layer of the modulator interposed between two mirrors is formed of InP.

31. A device according to claim 1, including three electrodes of the oscillator, an electrode deposited on the modulator, and an electrode that is common to the oscillator and to the modulator.

32. A device according to claim 1, including four electrodes: two electrodes deposited on respective contact layers of the oscillator, and two electrodes deposited on the modulator.

33. A device according to claim 1, wherein the oscillator itself generates a radio carrier and acts as a mixer for mixing its characteristic oscillation, imposed by the characteristics of the circuit in which it is inserted, with a data-carrying signal that arrives optically.

34. A device according to claim 1, wherein the oscillator is an optically locked oscillator, a radio carrier being conveyed by an optical distribution network, and the frequency of the oscillator being servo-controlled and synchronized continuously on the instantaneous value of the millimetric frequency present on the optical signal.

35. A device according to claim 34, wherein the oscillator is locked directly, the optical signal servo-controlling the oscillator itself.

36. A device according to claim 34, wherein the oscillator is locked indirectly, said oscillator being locked by an electrical signal output by a distinct photodetector.

37. A device according to claim 36, wherein the oscillator is locked by an electrical signal output by a photodetector-forming modulator.

38. A communications system comprising an optical fiber distribution network between at least one exchange and a plurality of stations each of which is equipped with a radio transmitter forming a radio access network at the end of the optical fiber network, said communications system including a both-way transposition device according to claim 1 in each of the stations.

* * * * *

UNITED STATES PATENT AND TRADEMARK OFFICE
CERTIFICATE OF CORRECTION

PATENT NO. : 5,946,438
DATED : August 31, 1999
INVENTOR(S) : Mino et al.

It is certified that error appears in the above-indentified patent and that said Letters Patent is hereby corrected as shown below:

On the title page, item [75], line 3, delete "Fontenay-Aux-Roses" and insert -- Faontenay- Aux-Roses -- .

In column 13, line 43, delete "wherein superlattice includes an the active layer" and insert -- wherein the superlattice includes an active layer -- .

Signed and Sealed this

Twentieth Day of March, 2001

*Attest:*

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO.   : 5,946,438
DATED        : August 31, 1999
INVENTOR(S)  : Minot et al.

It is certified that error appears in the above-identified patent and that said Letters Patent is hereby corrected as shown below:

<u>Title page,</u>
Item [75], delete "Faontenay-Aux-Roses" and insert -- Fontenay-Aux-Roses --.

Signed and Sealed this

Fourth Day of June, 2002

*Attest:*

JAMES E. ROGAN
*Attesting Officer*    *Director of the United States Patent and Trademark Office*